United States Patent
Hsieh et al.

(10) Patent No.: US 8,065,921 B2
(45) Date of Patent: Nov. 29, 2011

(54) AIRFLOW SPEED DETECTION DEVICE

(75) Inventors: Ming-Chih Hsieh, Taipei Hsien (TW);
Tsung-Hsi Li, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 226 days.

(21) Appl. No.: 12/629,890

(22) Filed: Dec. 3, 2009

(65) Prior Publication Data

US 2011/0072898 A1    Mar. 31, 2011

(30) Foreign Application Priority Data

Sep. 25, 2009 (CN) .......................... 2009 1 0307722

(51) Int. Cl.
*G01F 1/00* (2006.01)

(52) U.S. Cl. .......................................................... 73/861

(58) Field of Classification Search ............... 73/861, 73/861.77, 861.74, 861.75, 861.94; 70/110; 62/180, 184, 186; 340/870.37
See application file for complete search history.

(56) References Cited

U.S. PATENT DOCUMENTS 7,637,173 B2 * 12/2009 Hsieh et al. ............... 73/861.77
7,734,159 B2 * 6/2010 Beland et al. ............... 392/390
* cited by examiner

*Primary Examiner* — Jewel V Thompson
(74) *Attorney, Agent, or Firm* — Altis Law Group, Inc.

(57) ABSTRACT

An airflow speed detection device for measuring an airflow speed includes an airflow speed switch, and a connector. The airflow speed switch includes a detection head, and an elastic piece. The connector is electrically connected to the testing the airflow speed switch to connect an indicator to indicate close and open states of the airflow speed switch. If the airflow speed is not faster than a critical value, the elastic piece contacts the detection head to close the airflow speed switch. If the airflow speed is faster than the critical value, the elastic piece is blown away from the detection head to open the airflow speed switch.

20 Claims, 5 Drawing Sheets

AIRFLOW SPEED DETECTION DEVICE

BACKGROUND

1. Technical Field

The present disclosure relates to an airflow speed detection device.

2. Description of Related Art

Most of airflow speed measure devices in the market are of electronic type, such as a hot-wire anemometer, via which a value of an airflow speed at any time can be known. However, in some situations, detecting if the airflow exceeds a certain critical value is sufficient. For example, in a computer system, if a rotation speed of a fan (an airflow speed in the computer system depends on the rotation speed of the fan) exceeds a certain critical value, which means the computer system is too hot, as a response, the computer system will automatically power off to prevent damages from over heating. In such situation, if an electronic type anemometer is employed, it is high-cost and wasteful.

DETAILED DESCRIPTION

Figure 1:
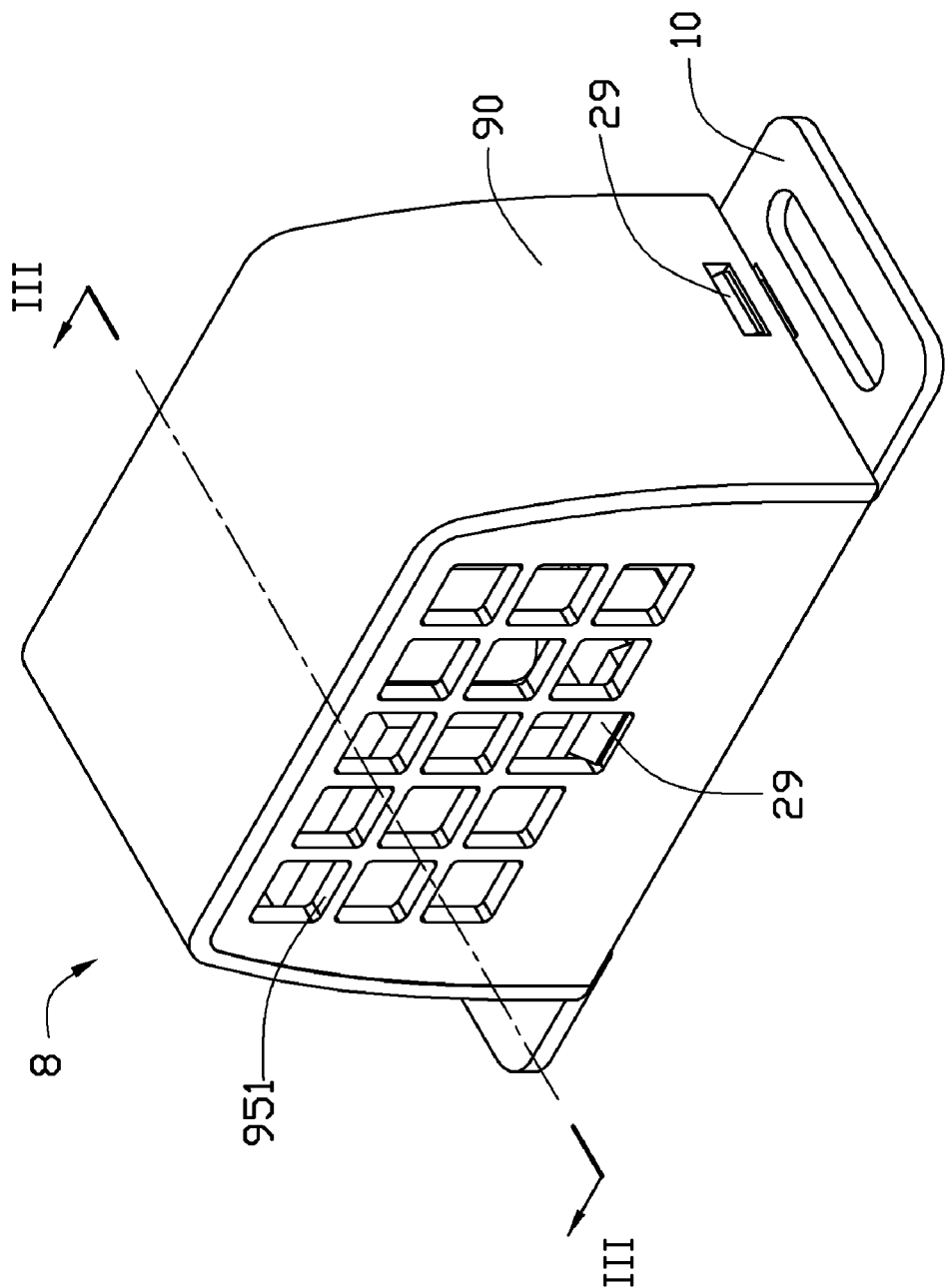
FIG. 1 is an isometric view of an embodiment of an airflow speed detection device.
Figure 2:
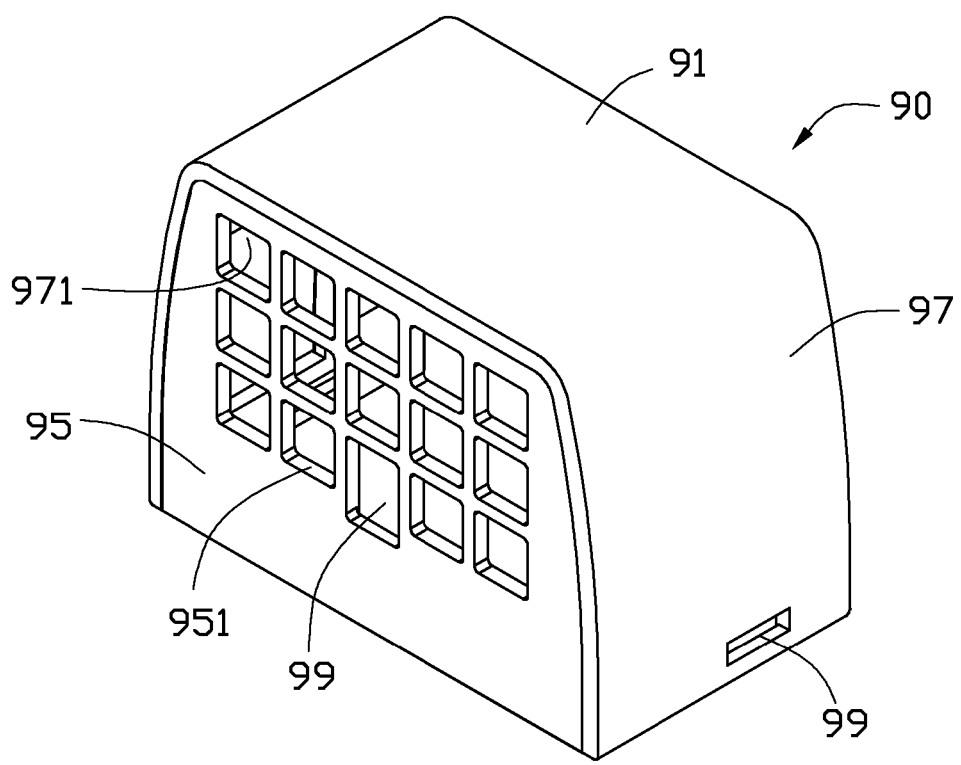
FIG. 2 is an exploded, isometric view of the airflow speed detection device in FIG. 1.
Figure 2:
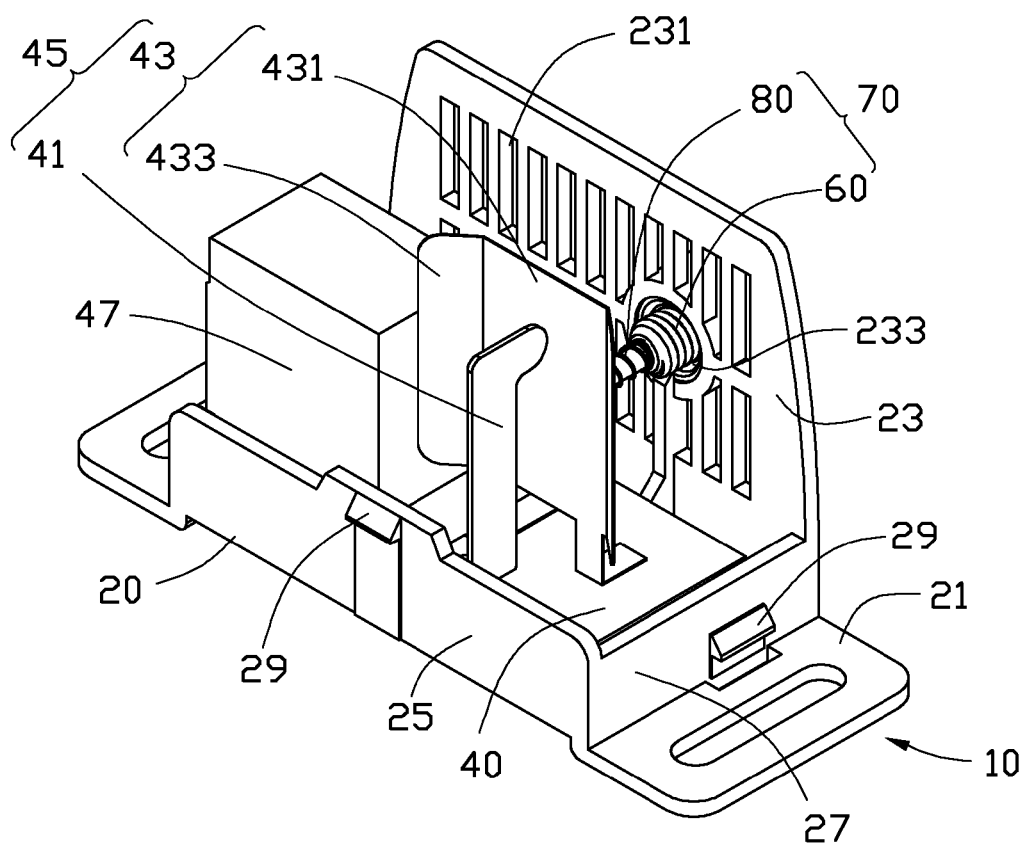

Referring to FIGS. 1 and 2, an embodiment of an airflow speed detection device 8 includes a main body 10, and a cover 90.

The main body 10 includes a base 20, a circuit board 40, a detection head 41, an elastic piece 43, a connector 47, a screw 60, and a spring 80.

The base 20 includes a bottom wall 21, a high rear wall 23 perpendicularly extending up from a rear side of the bottom wall 21, a low front wall 25 perpendicularly extending up from a front side of the bottom wall 21, and two low sidewalls 27 perpendicularly extending up from opposite ends of the bottom wall 21. The rear wall 23 defines a screw hole 233, and a plurality of first air vents 231. A hook 29 extends from an outer surface of each of the front wall 25 and the sidewalls 27.

The circuit board 40 is mounted to the bottom wall 21 of the base 20. The detection head 41 is generally "7"-shaped. The measure head 41 and the elastic piece 43 are fixed to the circuit board 40. The detection head 41 is adjacent to the front wall 25, and the elastic piece 43 is adjacent to the rear wall 23. A horizontal part of the detection head 41 extends towards the elastic piece 43. The connector 47 is mounted to the circuit board 40. The elastic piece 43 is fixed to the circuit board 40 via a lower end of the elastic piece 43, and the rest of the elastic piece 43 is deformable relative to the lower end of the elastic piece 43. The elastic piece 43 includes a rectangular main part 431, and two lateral parts 433 extending obliquely at an angle from the left and the right sides of the main part 431. A distal end of the horizontal part of the detection head 41 contacts the main part 431 of the elastic piece 43. The detection head 41 and the elastic piece 43 cooperatively form an airflow speed switch 45 of the present disclosure. The connector 47 includes an interface (not shown) to connect with an indicator 49 (see FIG. 4). The circuit board 40 includes or is connected to a power source.

Figure 3:
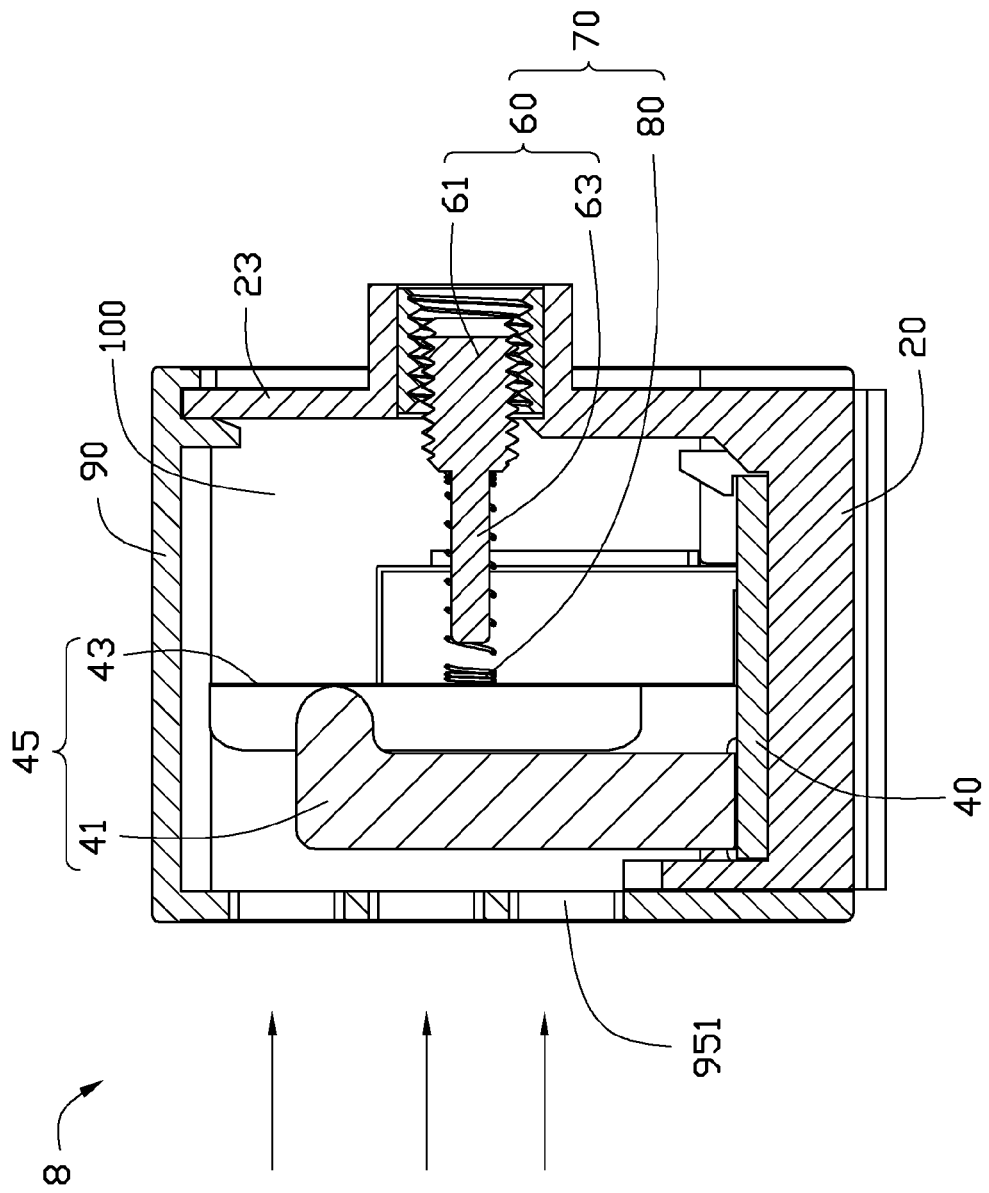
FIG. 3 is a cross section of the airflow speed detection device in FIG. 1, taken along the line III-III.

Referring to FIG. 3, the screw 60 includes a large threaded post 61, and a small holding post 63 extending from an end of the threaded post 61. The screw 60 is mounted to the base 20 by engaging the threaded post 61 in the screw hole 233 of the rear wall 23 of the base 20. The holding post 63 extends into the base 20. The spring 80 is fitted about the holding post 63, with opposite ends of the spring 80 abutting against the threaded post 61 and the main part 431 of the elastic piece 43, respectively. The screw 60 and the spring 80 cooperatively form a critical value adjuster 70 of the present disclosure.

The cover 90 includes a rectangular top sheet 91 opposite to the bottom wall 21 of the base 20 of the main body 10, a front sheet 95 extending downward from a front side of the top sheet 91, and two side sheets 97 extending downward from left and right ends of the top sheet 91 correspondingly. The front sheet 95 and the side sheets 97 each define a fixing hole 99 adjacent to a lower side of the front sheet 95 and the side sheets 97 correspondingly. A plurality of second air vents 951 is defined in the front sheet 95. The cover 90 is mounted to the base 20 by engaging the hooks 29 of the base 20 with the fixing holes 99 of the cover 90 correspondingly such that the front sheet 95 of the cover 90 is opposite to the rear wall 23 of the base 20. The base 20 and the cover 90 cooperatively define a space 100 for accommodating the circuit board 40, the airflow speed switch 45, and the connector 47. An opening 971 is defined in a corresponding side sheet 97, for exposing the interface of the connector 47 therethrough. The cover 90 is used to protect the circuit board 40, and the detachability of the cover 90 makes it convenient to provide service and maintenance to the circuit board 40. Furthermore, in other embodiments, each of the hooks 29 and a corresponding one of the fixing holes 99 may be replaced with each other.

Figure 4:
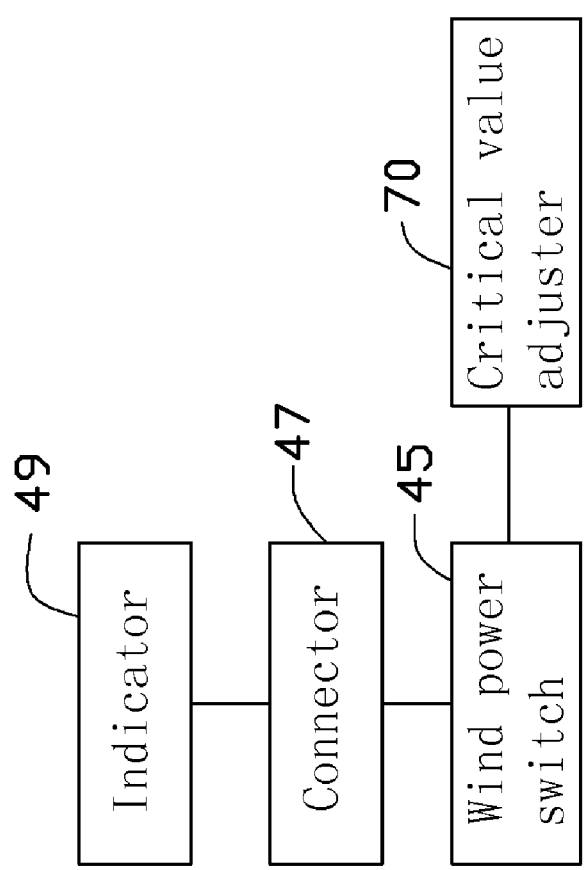
FIG. 4 is a block diagram of the airflow speed detection device of FIG. 2.

Referring to FIGS. 3 and 4, in use, the indicator 49 is connected to the connector 47 to indicate an open or close state of the airflow speed switch 45. The spring 80 of the critical value adjuster 70 provides an elastic force on the elastic piece 43 to contact the detection head 41. The screw 60 can be rotated to adjust the value of the elastic force of the spring 80, so as to set a desired critical value as a detection threshold for the airflow speed detection device 8. Air flows into the airflow speed detection device 8 through the plurality of second air vents 951. If the airflow speed is faster than the critical value, the power of the airflow acting on the elastic piece 43 is faster than the elastic force of the spring 80, as a result the elastic piece 43 is blown away from the detection head 41 towards the rear wall 23. Therefore, the airflow speed switch 45 is open, and the indicator 49 indicates that the airflow speed switch 45 is open. If the airflow speed is weaker than or just to the same as the critical value, the elastic piece 43 remains contacting the detection head 41, and the indicator 49 indicates that the airflow speed switch 45 is close.

Figure 5:
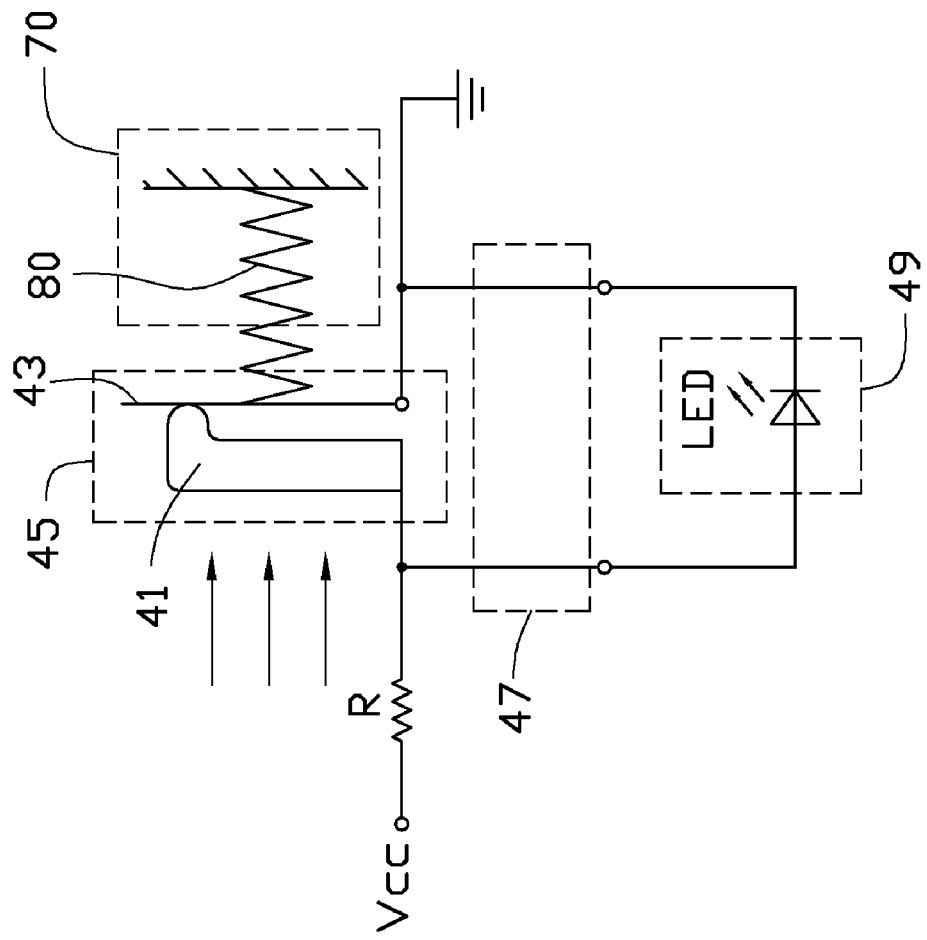
FIG. 5 is a circuit diagram of the airflow speed detection device of FIG. 4.

Referring to FIG. 5, in one embodiment, the airflow speed switch 45 is connected between a high level and a low level. The detection head 41 functions as a first terminal of the airflow speed switch 45, and the elastic piece 43 functions as a second terminal of the airflow speed switch 45. The indicator 49 is a light emitting diode (LED) whose anode and cathode are connected to the first and second terminals of the airflow speed switch 45, respectively. When the airflow speed switch 45 is close, the voltages of the two terminals of the LED are equal with each other. Therefore, the LED does not light, indicating that the airflow speed switch 45 is close. When the airflow speed switch 45 is open, the LED lights to indicate that the airflow speed switch 45 is open. In the embodiment, the function of the connector 47 is the equal of wires. Therefore, in other embodiments, the connector 47 may be omitted, and opposite terminals of the LED are directly connected to the detection head 41 and the elastic piece 43, respectively. Furthermore, in other embodiments, the indicator 49 may be an ohm gauge instead of an LED. If the ohm gauge shows that the resistance is zero, it means the airflow speed switch 45 is close, while if the ohm gauge shows that the resistance is infinite, it means the airflow speed switch 45 is open.

It is noted that the lateral parts 433 are used to help collecting airflow for the elastic piece 43. In other embodiments, the lateral parts 433 may be omitted, remaining the main part 431 to collect airflow to be detected. Furthermore, the lower end of the elastic piece 43 may be pivotably coupled to the circuit board 40, and in this situation, the elastic piece 43 may be an undeformable one.

In other embodiments, the indicator 49, such as the LED, may be directly fixed to the base 20, the cover 90, or the circuit board 40, and the connector 47 may be omitted.

In other embodiments, the critical value adjuster 70 may be omitted if the critical value is not need to be adjusted, and the critical value may only depend to the elasticity of the elastic piece 43.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An airflow speed detection device for measuring an airflow speed, the airflow speed detection device comprising:
    an airflow speed switch comprising a detection head, and an elastic piece; and
    a connector electrically connected to the airflow speed switch to connect an indicator to indicate close and open states of the airflow speed switch;
    wherein the elastic piece contacts the detection head to close the airflow speed switch in response to the airflow speed being not faster than a critical value, and the elastic piece is blown away from the detection head to open the airflow speed switch in response to the airflow speed being faster than the critical value.

2. The airflow speed detection device of claim 1, further comprising a critical value adjuster to adjust the critical value.

3. The airflow speed detection device of claim 2, further comprising a circuit board, wherein the detection head is fixed to the circuit board, a lower end of the elastic piece is unmovably connected to the circuit board, and the connector is electrically connected to the airflow speed switch via the circuit board.

4. The airflow speed detection device of claim 3, wherein the lower end of the elastic piece is fixed to the circuit board, and the rest of the elastic piece is deformable relative to the lower end of the elastic piece.

5. The airflow speed detection device of claim 3, further comprising a base, the circuit board is mounted to the base.

6. The airflow speed detection device of claim 5, wherein the base defines a screw hole, the critical value adjuster comprises a screw engaging in the screw hole, and a spring, the screw is movable along the screw hole when the screw is rotated, the spring and the detection head are located at opposite sides of the elastic piece, opposite ends of the spring abut against the elastic piece and the screw.

7. The airflow speed detection device of claim 5, further comprising a cover detachably mounted to the base, the base and the cover cooperatively bound a space for accommodating the circuit board, the airflow speed switch, and the connector.

8. The airflow speed detection device of claim 7, wherein a hook extends from one of the base and the cover, a fixing hole is defined in the other one of the base and the cover, and the cover is mounted to the base by engaging the hook with the fixing hole.

9. The airflow speed detection device of claim 7, wherein the base comprises a rear wall for bounding the space, a plurality of first air vents is defined in the rear wall, the cover comprises a front sheet opposite to the rear wall for bounding the space, a plurality of second air vents is defined in the front sheet.

10. The airflow speed detection device of claim 1, wherein the elastic piece comprises a rectangular main part, and two lateral parts extending obliquely at an angle from opposite sides of the main part, to guide airflow towards the elastic piece.

11. An airflow speed detection device for measuring an airflow speed, the airflow speed detection device comprising:
    an airflow speed switch comprising a detection head in a direction of the airflow, and an elastic piece facing the airflow across the detection head; and
    an indicator comprising a first end electrically connected to the detection head, and a second end electrically connected to the elastic piece, to indicate close and open states of the airflow speed switch;
    wherein the elastic piece contacts the detection head to close the airflow speed switch in response to the airflow speed being not faster than a critical value, and the elastic piece is blown away from the detection head to open the airflow speed switch in response to the airflow speed being faster than the critical value.

12. The airflow speed detection device of claim 11, further comprising a critical value adjuster to adjust the critical value.

13. The airflow speed detection device of claim 12, further comprising a base to carry the airflow speed switch and the indicator.

14. The airflow speed detection device of claim 13, wherein the base defines a screw hole, the critical value adjuster comprises a screw engaging in the screw hole, and a spring, the screw is movable along the screw hole when the screw is rotated, the spring and the detection head are located at opposite sides of the elastic piece, opposite ends of the spring abut against the elastic piece and the screw.

15. The airflow speed detection device of claim 11, wherein the indicator is a light emitting diode whose anode and cathode are connected to the detection head and the elastic piece of the airflow speed switch, respectively.

16. An airflow speed detection device for measuring an airflow speed, the airflow speed detection device comprising:
    an airflow speed switch comprising an elastic piece, and a detection head located at a first side of the elastic piece, wherein the first side of the elastic piece faces the airflow; and
    a critical value adjuster providing elastic force to a second side of the elastic piece opposite to the first side;
    wherein the elastic piece contacts the detection head to close the airflow speed switch in response to the airflow power due to the airflow speed being not faster than the elastic force of the critical value adjuster, the elastic piece is blown away from the detection head to open the airflow speed switch in response to the airflow power being faster than the elastic force.

17. The airflow speed detection device of claim 16, further comprising a base, wherein the airflow speed switch and the critical value adjuster are mounted to the base.

18. The airflow speed detection device of claim 17, wherein the base defines a screw hole, the critical value adjuster comprises a screw engaging in the screw hole, and a spring, the screw is movable along the screw hole when the screw is rotated, the spring and the detection head are located at opposite sides of the elastic piece, opposite ends of the spring abut against the elastic piece and the screw.

19. The airflow speed detection device of claim 18, wherein the screw comprises a threaded post screwed in the screw hole of the base, and a thin holding post extending from the threaded post, the spring is fitted about the holding post.

20. The airflow speed detection device of claim 16, further comprising a connector electrically connected to the detection head and the elastic piece of the airflow speed switch, to connect an indicator to indicate the close and open states of the airflow speed switch.

* * * * *